US006416184B1

(12) United States Patent
Arai et al.

(10) Patent No.: US 6,416,184 B1
(45) Date of Patent: Jul. 9, 2002

(54) PROJECTOR WITH DUSTPROOF VENTILATING MEMBER

(75) Inventors: Jun Arai; Shogo Kurosawa, both of Matsumoto; Nobuo Watanabe, Shiojiri, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/512,771

(22) Filed: Feb. 25, 2000

(30) Foreign Application Priority Data

Feb. 25, 1999 (JP) ............................................ 11-048572

(51) Int. Cl.⁷ ........................ G03B 21/16; G03B 21/18; G03B 3/00; G03B 21/14; G03B 21/22
(52) U.S. Cl. ......................... 353/52; 353/60; 353/101; 353/119; 349/5
(58) Field of Search ................................. 353/119, 122, 353/52, 61, 57, 60, 100, 101, 31, 33, 71, 55, 56; 349/5, 8, 57, 6, 7, 9

(56) References Cited

U.S. PATENT DOCUMENTS

| | | | | |
|---|---|---|---|---|
| D249,530 S | * | 9/1978 | Brett | D16/48 |
| 5,895,110 A | * | 4/1999 | Okada et al. | 353/31 |
| 6,109,767 A | * | 8/2000 | Rodriguez | 362/294 |
| 6,227,671 B1 | * | 5/2001 | Haba | 353/31 |
| 6,231,191 B1 | * | 5/2001 | Shiraishi et al. | 353/61 |
| 6,280,036 B1 | * | 8/2001 | Suzuki | 353/31 |

* cited by examiner

Primary Examiner—Russell Adams
Assistant Examiner—Melissa J. Koval
(74) Attorney, Agent, or Firm—Oliff & Berridge, PLC

(57) ABSTRACT

A projector is provided in which the production of an outer casing is facilitated, cooling efficiency is maintained well, and the outward appearance is preferable. A dustproof ventilating member is mounted in a clearance formed between the rim of an opening of a front casing forming an outer casing, and a projection lens. For this reason, cooling air can be reliably drawn into a device via the ventilating member. Since this eliminates the necessity for forming a meshed air inlet in the outer casing, the production of the outer casing is facilitated, and the manufacturing operation of the projector is easily performed. Moreover, cooling efficiency is maintained well, and the outward appearance is made preferable.

6 Claims, 10 Drawing Sheets

PROJECTOR WITH DUSTPROOF VENTILATING MEMBER

BACKGROUND OF THE INVENTION

1. Field of Invention

The present invention relates to a projector including an electro-optical device for forming an optical image according to image information, a projection lens for enlarging and projecting the image formed by the electro-optical device, a lens positioning mechanisms for adjusting the image projecting position, and an outer casing for covering the main bodies thereof.

2. Description of Related Art

Hitherto, a projector has been known which includes a light-source unit having a light source, an electro-optical device for forming an optical image according to image information by using a light beam emitted from the light source, a projection lens for enlarging and projecting the image formed by the electro-optical device, a lens positioning mechanism for adjusting the image projecting position, and an outer casing for housing these components.

Such projectors are widely used for multimedia presentations at conferences, academic meetings, exhibitions, and the like.

In this case, the brightness of a display screen is sometimes increased to improve visibility of the display screen in the projector.

In general, the brightness of the display screen is improved by stacking a plurality of projectors and superimposing images projected from the projectors. If the projecting positions of the images projected from the projectors are not completely aligned, displayed images are offset from one another.

For this reason, in conventional projectors, a projection lens is moved vertically by a lens positioning mechanism in order to adjust the projecting position of an image projected from the projection lens. The image offset can be prevented by adjusting the image projecting position in each of the projectors, and this improves brightness of the display screen.

Since heat-generating members, such as a light source, and a power-supply unit, are contained in the outer casing of the projector, the inside of the device needs to be efficiently cooled.

For that purpose, the outer casing for housing the components in the conventional projector is provided with a meshed air inlet having a size such that dirt and dust do not enter the inside of the device therethrough, and the inside of the device is reliably cooled by a larger amount of cooling air.

Although such a meshed air inlet can be simultaneously formed when the outer casing is formed by injection molding or the like, the size of each hole is substantially small, and clogging is sometimes caused by burrs or the like produced in molding. In such a case, it is necessary to perform unclogging, and to perform another operation of forming a complete air inlet through the outer casing. Since this takes a lot of labor, the operation of producing the outer casing, and the operation of manufacturing the projector are troublesome. Furthermore, a meshed air inlet is formed in the outer casing, and the outward appearance of the projector is impaired.

SUMMARY OF THE INVENTION

The present invention provides a projector in which the production of an outer casing is facilitated, cooling efficiency is maintained, and the outward appearance is preferable.

A projector of the present invention includes a light source, an electro-optical device for forming an optical image according to image information by using a light beam emitted from the light source, a projection lens for enlarging and projecting the image formed by the electro-optical device, a lens positioning mechanism for adjusting the image projecting position, and an outer casing for covering the bodies thereof. The projection lens is projected outside from an opening formed in the outer casing, and the clearance formed between the projection lens and the rim of the opening of the outer casing is filled with a dustproof ventilating member.

According to the present invention, since the projection lens projecting outside from the opening formed in the outer casing is moved, for example, vertically by the lens positioning mechanism in order to adjust the image projecting position, the opening of the outer casing is formed for the vertical movement of the projection lens.

In short, a sufficiently large clearance is formed between the rim of the opening of the outer casing and the projection lens so as to link the inside and the outside. By providing the dustproof ventilating member in this clearance, cooling air can be reliably drawn into the device via the ventilating member. Since this eliminates the necessity of forming a meshed air inlet in the outer casing, the production of the outer casing is facilitated, and the manufacturing operation of the projector is easily performed. Moreover, cooling efficiency is maintained well, and the outward appearance is made preferable.

In the above projector, it is preferable that the lens positioning mechanism includes a fixed member fixed to the side of the electro-optical device, and a movable member to which the projection lens is connected and which is slidably mounted on the fixed member, and that the space between the fixed member and the movable member be enclosed by an airtight member.

In this way, since the space between the fixed member and the movable member is sufficiently enclosed by providing the airtight member therein, there is no fear that light will leak from the sliding portion of the lens positioning mechanism.

In this case, when the surface of the airtight member is black, light that impinges on and is reflected by the light incident side of the projection lens can be absorbed by the airtight member. This makes it possible to sufficiently reduce reflectance inside the device.

When the airtight member is formed of a felt member, it is possible to improve the sliding ability of the movable member relative to the fixed member while ensuring sufficient air tightness between the fixed member and the movable member.

Furthermore, it is preferable that the lens positioning mechanism be operated by a rotary knob provided such that the rotary knob can be projected over and be retracted into the outer casing at will.

By doing this, when the lens positioning mechanism is operated, the rotary knob may be projected from the outer casing. Conversely, when the lens positioning mechanism is not operated, the rotary knob may be pushed into the device so as not to project from the outer casing.

Therefore, since it is satisfactory if the rotary knob is projected only in operating the lens positioning mechanism, there is no fear that the rotary knob will be broken against a desk or the like in carrying the projector, and handling is thereby facilitated.

In addition, when the rotary knob is depressed inside the device, the end portion of the rotary knob and the surface of the outer casing can be made nearly flush with each other. Therefore, the outward appearance of the outer casing is simplified, and the outward appearance of the projector is improved.

DETAILED DESCRIPTION OF PREFERRED EMBODIMENTS

An embodiment of the present invention will be described below with reference to the drawings.

(1) Overall Configuration of the Device

Figure 1:
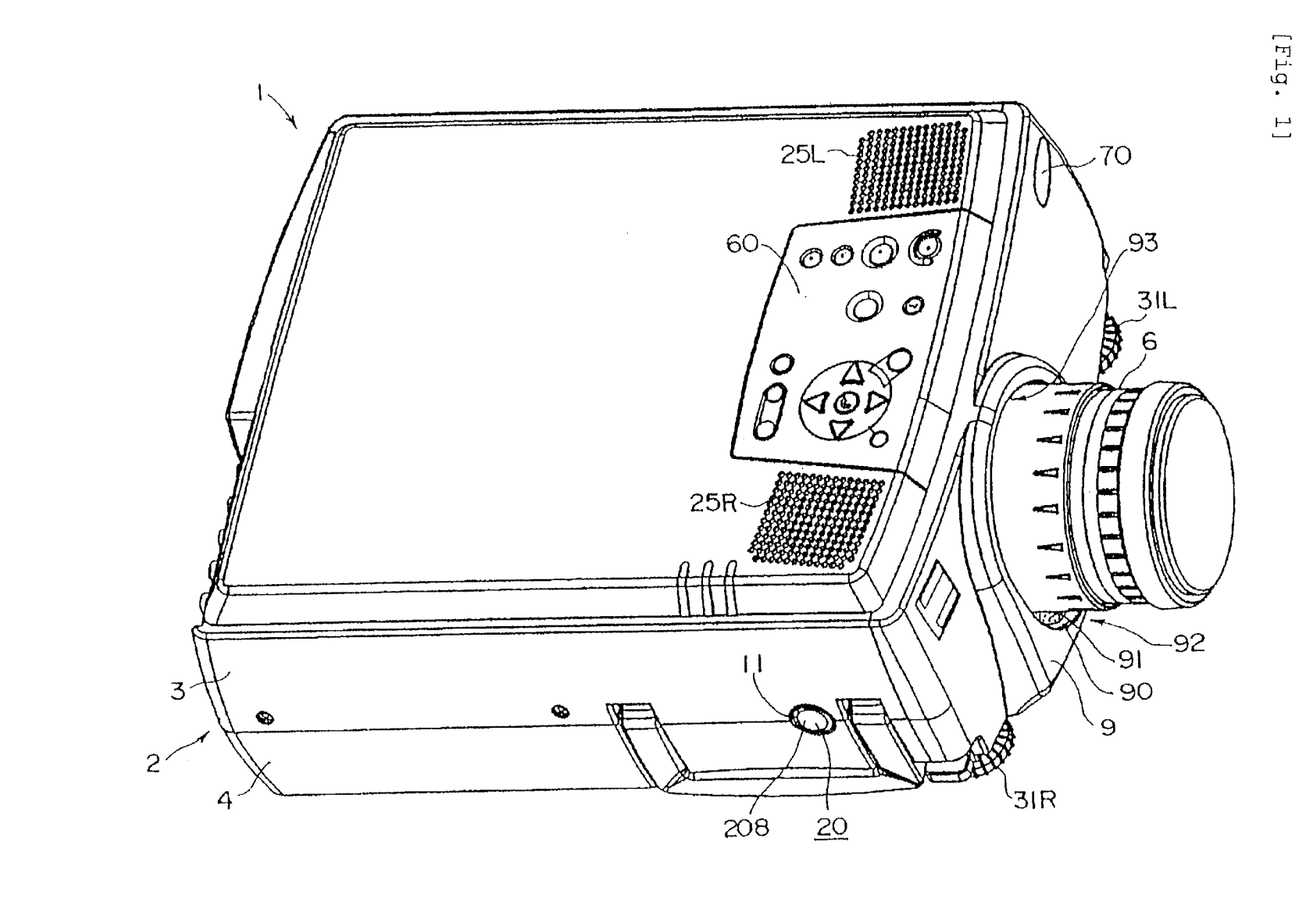
FIG. 1 is an outward perspective view of a projector according to an embodiment of the present invention, as viewed from the top side.
Figure 2:
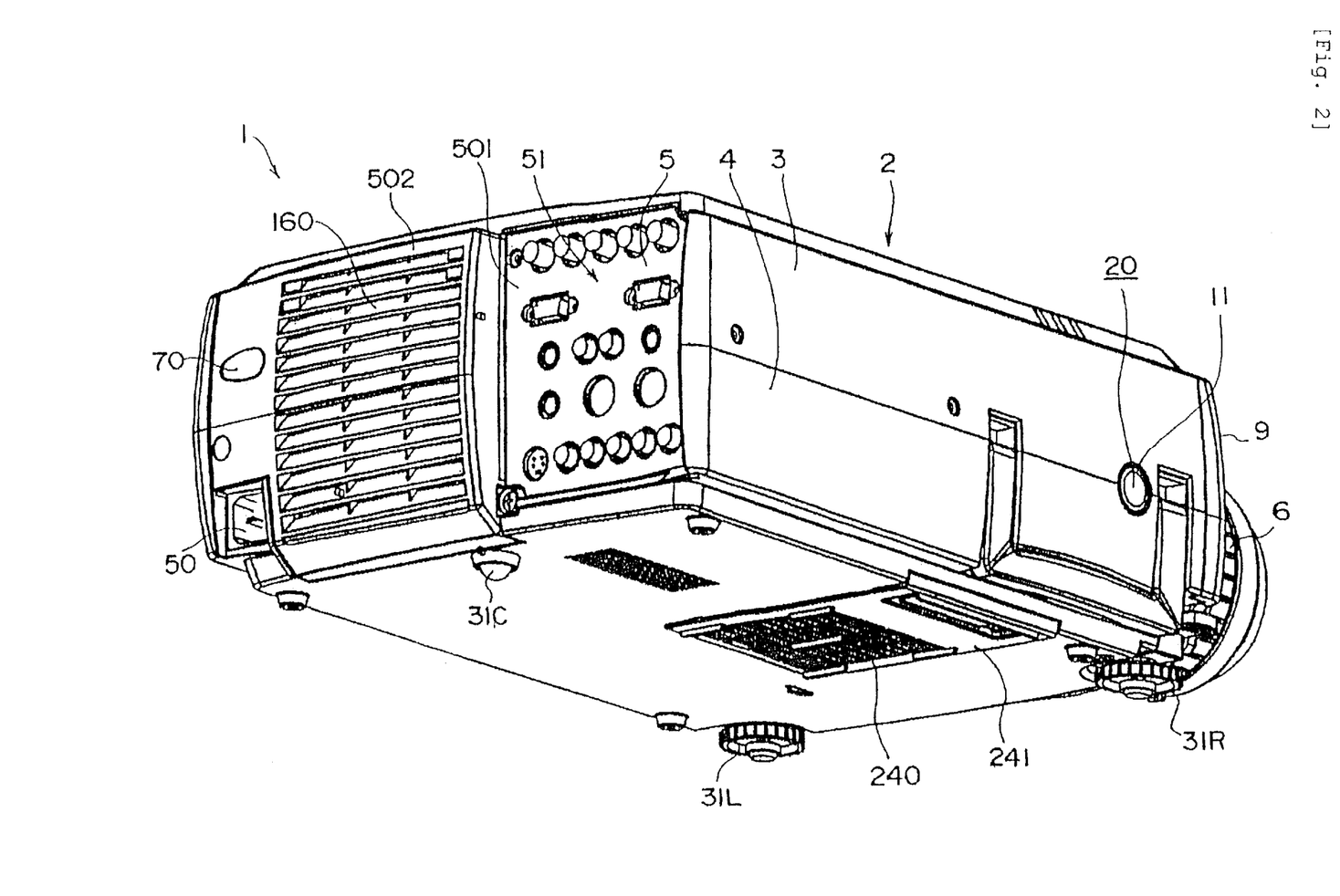
FIG. 2 is an outward perspective view of the projector of the embodiment, as viewed from the bottom side.

FIGS. 1 and 2 are schematic perspective views of a projector 1 according to this embodiment. FIG. 1 is a perspective view, as viewed from the top side, and FIG. 2 is a perspective view, as viewed from the bottom side.

The projector 1 is of the type that separates a light beam emitted from a light-source lamp, which serves as a light source, into beams of the three primary colors, red (R), green (G), and blue (B), modulates these color light beams according to image information via liquid crystal panels constituting an electro-optical device, synthesizes the modulated color beams by a prism (color synthesizing optical system), and enlarges and projects the synthesized light beams onto a projection plane via a projection lens 6. The components excluding a part of the projection lens 6 are housed inside an outer casing 2.

(2) Structure of Outer Casing

The outer casing 2 basically comprises an upper casing 3 for covering the top face of the device, a lower casing 4 for forming the bottom face of the device, a front casing 9 for covering the front face, and a rear casing 5 (FIG. 2) for covering the rear face, which casings may be made of metal, such as magnesium, except for the rear casing 5 made of resin.

As shown in FIG. 1, many communication holes 25R and 25L for speakers are formed at the right and left front ends of the top face of the upper casing 3. Between these communication holes 25R and 25L, a control panel 60 is disposed to control image quality and the like of the projector 1. Furthermore, a light receiving portion 70 is provided at the right top of the front casing 9 so as to receive an optical signal from a remote control that is not shown.

As shown in FIG. 2, an air inlet 240 is disposed at about the center of the bottom face of the lower casing 4 so as to intake cooling air for cooling the inside of the device. The air inlet 240 is formed in a filter replacement cover 241 made of resin. A filter held inside is allowed to be replaced by attaching and detaching the filter replacement cover 241 to and from the side of the lower casing 4.

The bottom face of the lower casing 4 is also provided with feet 31R and 31L at the right and left front corners, and a foot 31C at about the rear center end. By controlling the amount of vertical extension and retraction of the feet 31R and 31L, the inclination of the projector can be changed.

As shown in FIG. 2, the rear casing 5 includes an interface panel 501 provided corresponding to a group of various kinds of input-output terminals 51 arranged on the rear side of the device, and a light-source lamp replacement cover 502 having an air outlet 160 serving as a ventilation opening for exhausting the inside air of the device, and a light receiving portion 70. On the rear side of the device, an AC inlet 50 for external power supply is placed.

A hole 11 is formed at the connecting portion between the upper casing 3 and the lower casing 4 on the side face of the outer casing 2. From this hole 11, an end face of a pop-up rotary knob 20 mounted inside the device 1 is exposed, which will be described later. The end face of the rotary knob 20 and the surface of the outer casing 2 are substantially flush with each other.

(3) Inner Configuration of the Device

Figure 3:
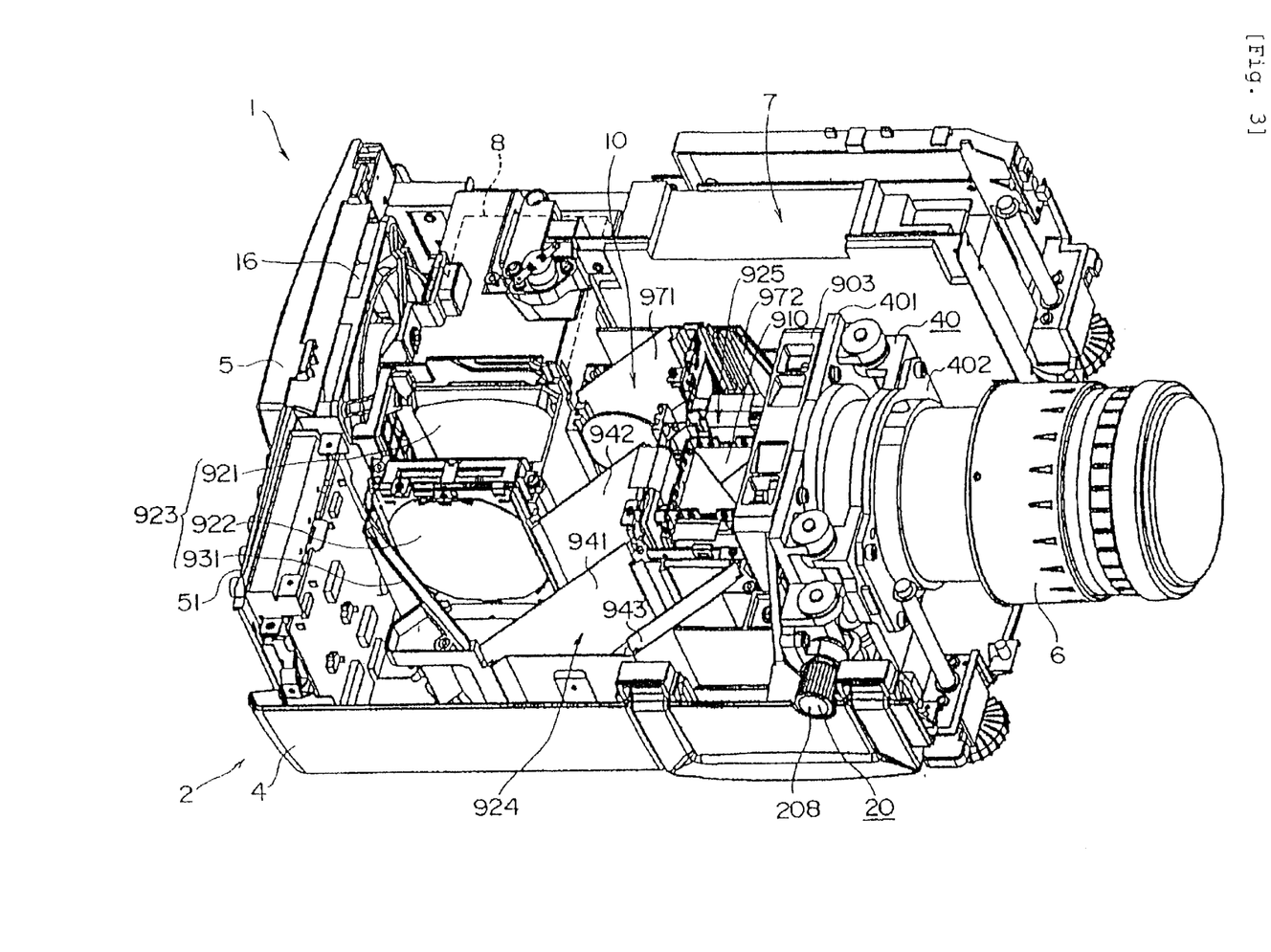
FIG. 3 is a perspective view showing the internal configuration of the projector of the embodiment.

FIG. 3 shows the inner configuration of the projector 1.

As this figure shows, a power supply unit 7 serving as a power supply that is placed on one side of the projection lens 6, a light-source lamp unit 8 placed in the rear of the power supply unit 7 so as to serve as a light source unit, an optical unit 10 forming an optical system, a driver board (not shown) for driving an electro-optical device 925 in the unit 10, a main board (not shown) for controlling the overall device 1, and the like are held inside the device 1.

The power supply unit 7 transforms electric power from the AC inlet 50, and supplies the power to the light-source lamp unit 8, the driver board, the main board, intake fans (not shown) placed below or below and above the electro-optical device 925, an exhaust fan 16 placed behind the light-source lamp unit 8, and the like. The power supply unit 7 includes a power-supply circuit substrate on which a power-supply filter, a transformer, a rectifier circuit, a smoothing circuit, a voltage stabilizing circuit, and the like are formed, a lamp driving substrate for driving a light-source lamp 181 in the light-source lamp unit 8, and the like.

Figure 4:
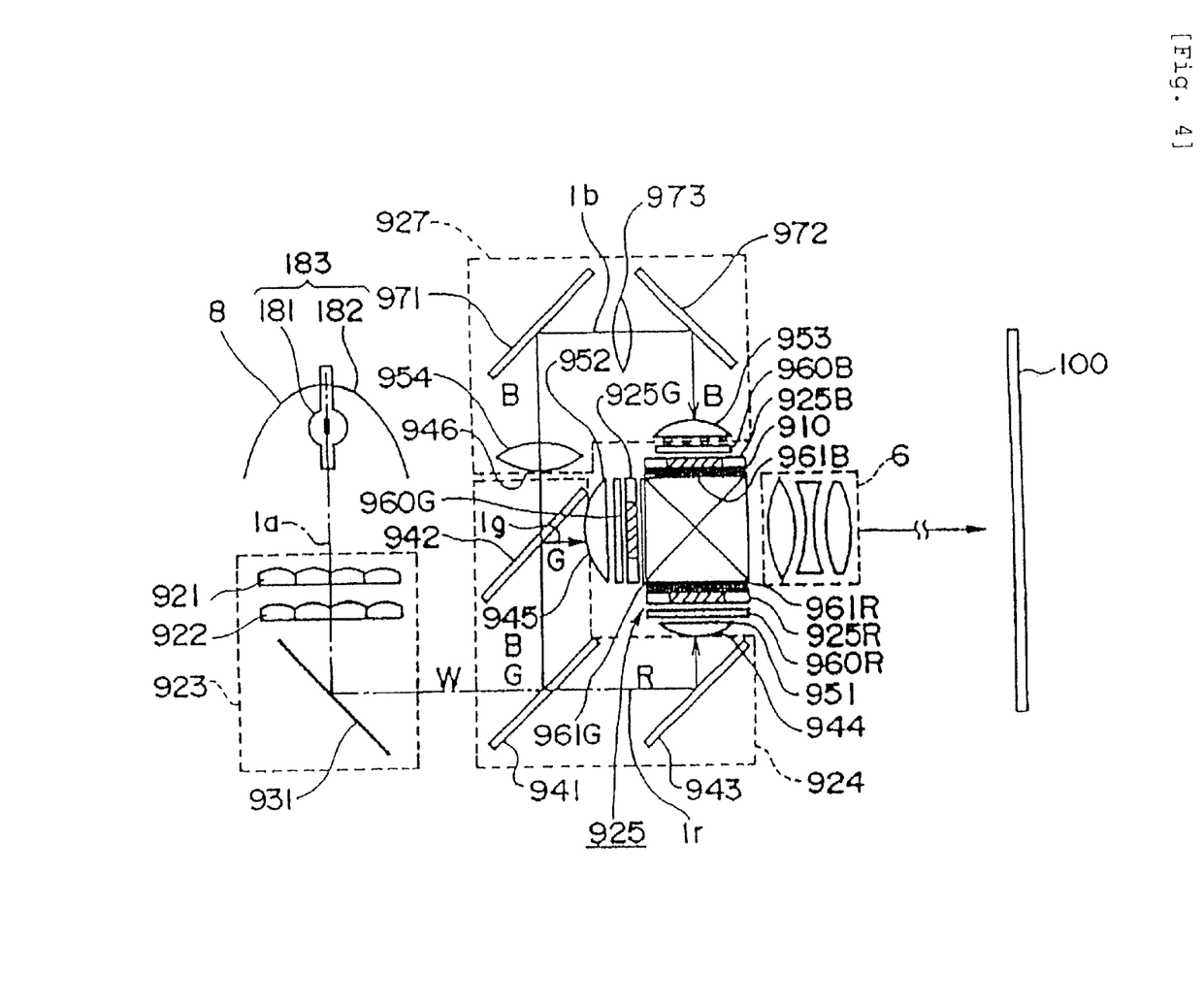
FIG. 4 is a schematic view explaining the structure of an optical system in the embodiment.

The light-source lamp unit 8 constitutes a light-source section of the projector 1, and includes a light-source device 183 including the light-source lamp 181 and a reflector 182, and a lamp housing (not shown) for housing the light-source device 183, as shown in FIG. 4. Such a light-source lamp unit 8 is cooled by cooling air from the above-described intake fan and cooling air drawn from a clearance 92 (FIG. 6) between the outer casing 2 and the projection lens 6. Cooling air first cools the electro-optical device 925, the power supply unit 7, and the like immediately after being drawn, and flows backward to cool almost all over the inside of the device 1. Finally, most of the cooling air passes through the light-source lamp unit 8, and is exhausted by the exhaust fan 16. Since the light-source lamp unit 8 is placed just before the exhaust fan 16, the light source device 183 therein can be efficiently cooled by a large amount of cooling air.

The optical unit 10 is a unit that forms an optical image corresponding to image information by optically processing a light beam emitted from the light-source lamp unit 8, and includes an illumination optical system 923, a color separation optical system 924, the electro-optical device 925, and a prism unit 910 serving as a color synthesizing optical system. The optical elements in the optical unit 10 other than the electro-optical device 925 and the prism unit 910 are vertically held between upper and lower light guides (not shown). The upper light guide and the lower light guide are combined into one and are fixed to the lower casing 4 by fixing screws. These light guides are also fixed to the prism unit 910 by fixing screws.

Figure 5:
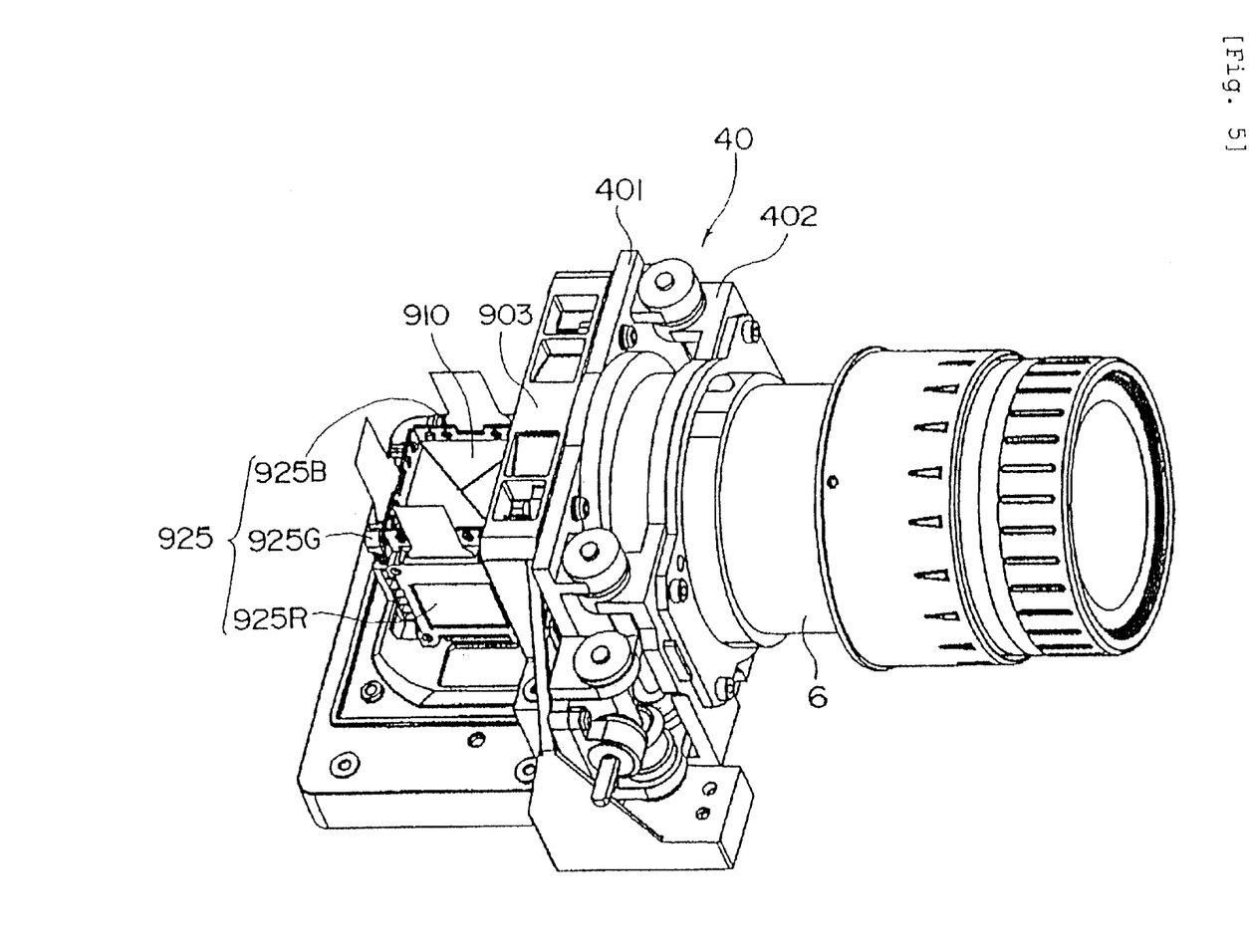
FIG. 5 is a perspective view showing the constituents in the embodiment.

The prism unit 910 shaped like a rectangular parallelepiped is fixed by fixing screws to the rear side of a head member 903 that is formed of an integrally molded magnesium part and having a nearly L-shaped profile, as shown in FIG. 5. Liquid crystal panels 925R, 925G and 925B for constituting the electro-optical device 925 are fixed to three side faces of the prism unit 910 via a fixing member.

The driver board drives and controls the liquid crystal panels 925R, 925G, and 925B in the electro-optical device 925, and is disposed above the optical unit 10.

The main board is provided with a control circuit for controlling the entire projector 1, and is placed above the driver board. Such a main board is electrically connected to the driver board and the control panel 60 described above.

(4) Configuration of Optical System

Next, the configuration of the optical system in the projector 1, i.e., the optical unit 10, will be described with reference to FIG. 4 as a schematic view.

As described above, the optical unit 10 includes the illumination optical system 923 for uniformizing the in-plane illumination distribution of a light beam (W) from the light-source lamp unit 8, the color separation optical system 924 for separating the light beam (W) from the illumination optical system 923 into red (R), green (G), and blue (B) beams, the electro-optical device 925 for modulating the color beams R, G, and B according to image information, and the prism unit 910 that serves as the color synthesizing optical system for synthesizing the modulated color beams.

The illumination optical system 923 includes a first lens plate 921, a second lens plate 922 disposed on the emergent side of the first lens plate 921, and a reflecting mirror 931 for bending an optical axis 1$a$ of the light beam W emitted from the light-source lamp unit 8 toward the front of the device 1.

The first lens plate 921 includes a plurality of rectangular lenses arranged in a matrix, splits the light beam emitted from the light source into a plurality of partial beams, and collects the partial beams near the second lens plate 922.

The second lens plate 922 includes a plurality of rectangular lenses arranged in a matrix, and has the function of superimposing the partial beams emitted from the first lens plate 921 onto the liquid crystal panels 925R, 925G, and 925B (which will be described later) constituting the electro-optical device 925.

In this way, since the liquid crystal panels 925R, 925G, and 925B can be illuminated with light having substantially uniform illuminance by the illumination optical system 923 in the projector 1 of this embodiment, it is possible to obtain a projection image having uniform illuminance.

The color separation system 924 includes a blue and green reflecting dichroic mirror 941, a green reflecting dichroic mirror 942, and a reflecting mirror 943. First, a blue beam B and a green beam G contained in the light beam W emitted from the illumination optical system 923 are perpendicularly reflected by the blue and green reflecting dichroic mirror 941, and travel toward the green reflecting dichroic mirror 942.

A red beam R passes through the blue and green reflecting dichroic mirror 941, is perpendicularly reflected by the reflecting mirror 943 disposed at the rear thereof, and emerges from an emergent portion 944 for the red beam R toward the prism unit 910.

Next, only the green beam G of the blue and green beams B and G reflected by the blue and green reflecting dichroic mirror 941 is perpendicularly reflected by the green reflecting dichroic mirror 942, and emerges from an emergent portion 945 for the green beam G toward the prism unit 910.

The blue beam B passed through the green reflecting dichroic mirror 942 emerges from an emergent portion 946 for the blue beam B toward a relay optical system 927. In this embodiment, the distances from an emergent portion for the light beam W of the illumination optical system 923 to the emergent portions 944, 945, and 946 of the color separation optical system 924 for the color beams R, G, and B are set to be equal.

On the emergent sides of the emergent portions 944 and 945 of the color separation optical system 924 for the red and green beams R and G respectively, light-collecting lenses 951 and 952 are disposed, respectively. Therefore, the red and green beams R and G emitted from the emergent portions enter these light-collecting lenses 951 and 952, where they are collimated.

The red and green beams R and G thus collimated pass through incident-side polarizers 960R and 960G, and enter the liquid crystal panels 925R and 925G serving as optical modulation devices, where they are modulated and given corresponding image information. That is, these liquid crystal panels 925R and 925G are subjected to switching control according to image information by the above-described driver board, thereby modulating the color beams passing therethrough.

In contrast, the blue beam B is guided to the corresponding liquid crystal panel 925B via the relay optical system 927, where it is similarly subjected to modulation according to image information. As the liquid crystal panels 925R, 925G, and 925B of this embodiment, for example, liquid crystal panels may be adopted that use a polysilicon TFT as a switching element.

The relay optical system 927 includes a light-collecting lens 954 disposed on the emergent side of the emergent portion 946 for the blue beam B, an incident-side reflecting mirror 971, an emergent-side reflecting mirror 972, an intermediate lens 973 interposed between these reflecting mirrors, and a light-collecting lens 953 disposed before the liquid crystal panel 925B. The blue beam B emerging from the light-collecting lens 953 passes through an incident-side polarizer 960B, and enters the liquid crystal panel 925B, where it undergoes modulation.

In this case, the optical axis 1$a$ of the light beam W and the optical axes 1$r$, 1$g$, and 1$b$ of the color beams R, G, and B are formed in the same plane. The blue beam B has the longest one of the optical path lengths of the color beams, namely, the distances from the light-source lamp 181 to the liquid crystal panels. Therefore, this light beam undergoes the largest light loss. The light loss can, however, be reduced by interposing the relay optical system 927.

Next, the color beams R, G, and B modulated through the liquid crystal panels 925R, 925G, and 925B pass through emergent-side polarizers 961R, 961G, and 961B respectively, and enter the prism unit 910, where they are synthesized. A color image formed by synthesis by the prism unit 910 is enlarged and projected via the projection lens 6 onto a projection plane 100 that is disposed at a predetermined position.

(5) Mounting Structure of Projection Lens

In FIG. 5, the projection lens 6 is connected on the light incident side to a lens positioning mechanism 40 so as to be thereby vertically moved. As shown in FIG. 1, the light emergent side of the projection lens 6 projects outside from an opening 93 formed in the front casing 9.

Considering that the projection lens 6 is vertically moved by the lens positioning mechanism 40, the opening 93 is shaped like an elongated hole so as to be larger than the diameter of the projection lens 6. In the rim of the opening 93, a cylindrical flange portion 90 is formed to extend toward the inside of the device 1.

Figure 6:
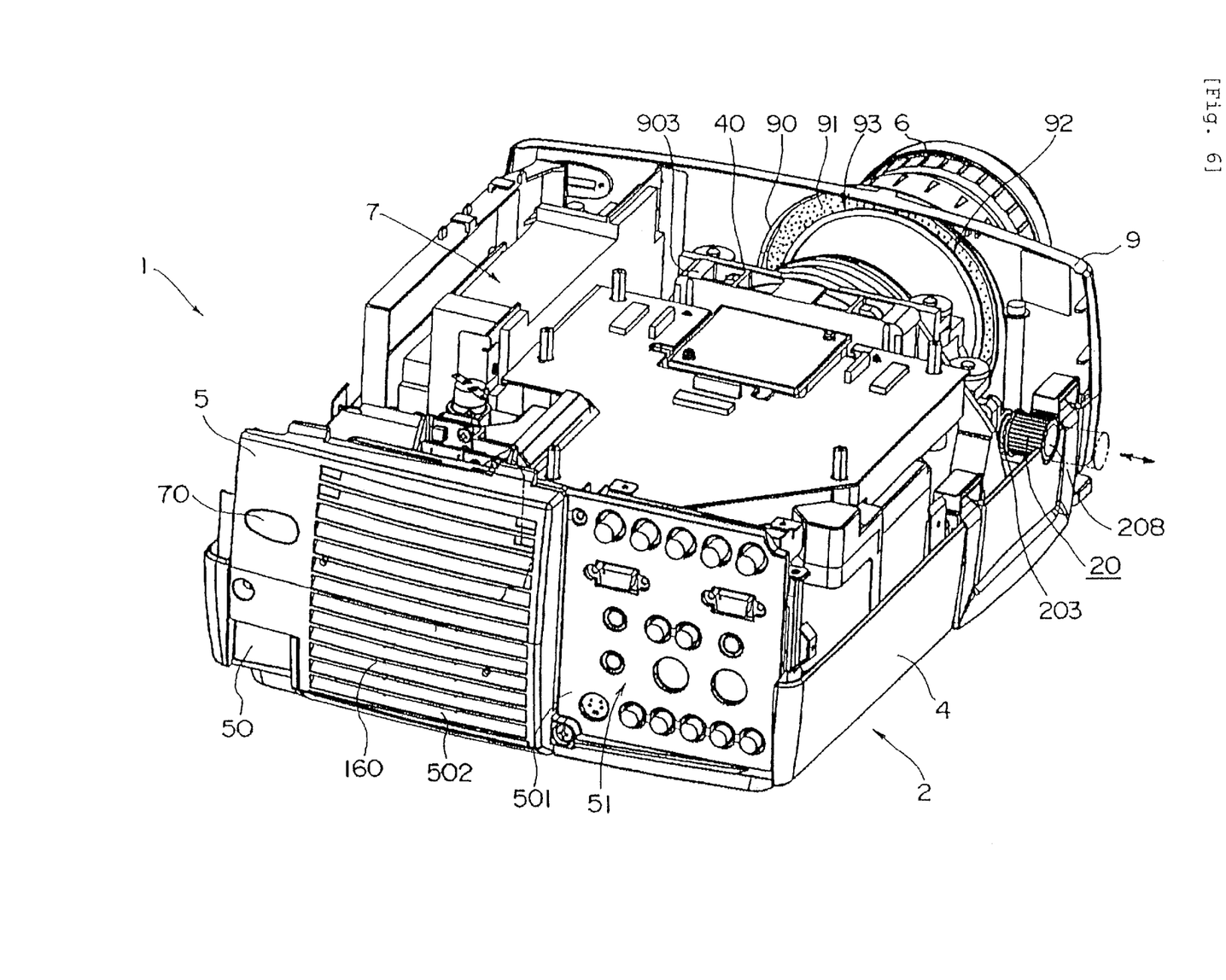
FIG. 6 is a perspective view of the projector of the embodiment, as viewed from the rear side.

For this reason, the clearance 92 is formed between the outer peripheral surface of the projection lens 6 and the rim of the opening 93 (the flange portions 90) of the front casing 9. The clearance 92 is filled with a ventilating member 91 bonded to the flange portion 90 with a double-sided adhesive tape or the like having dust preventing ability and elasticity, as shown in FIG. 6. Cooling air for cooling the inside of the device 1 is thereby drawn from the clearance 92 into the device 1.

Figure 7:
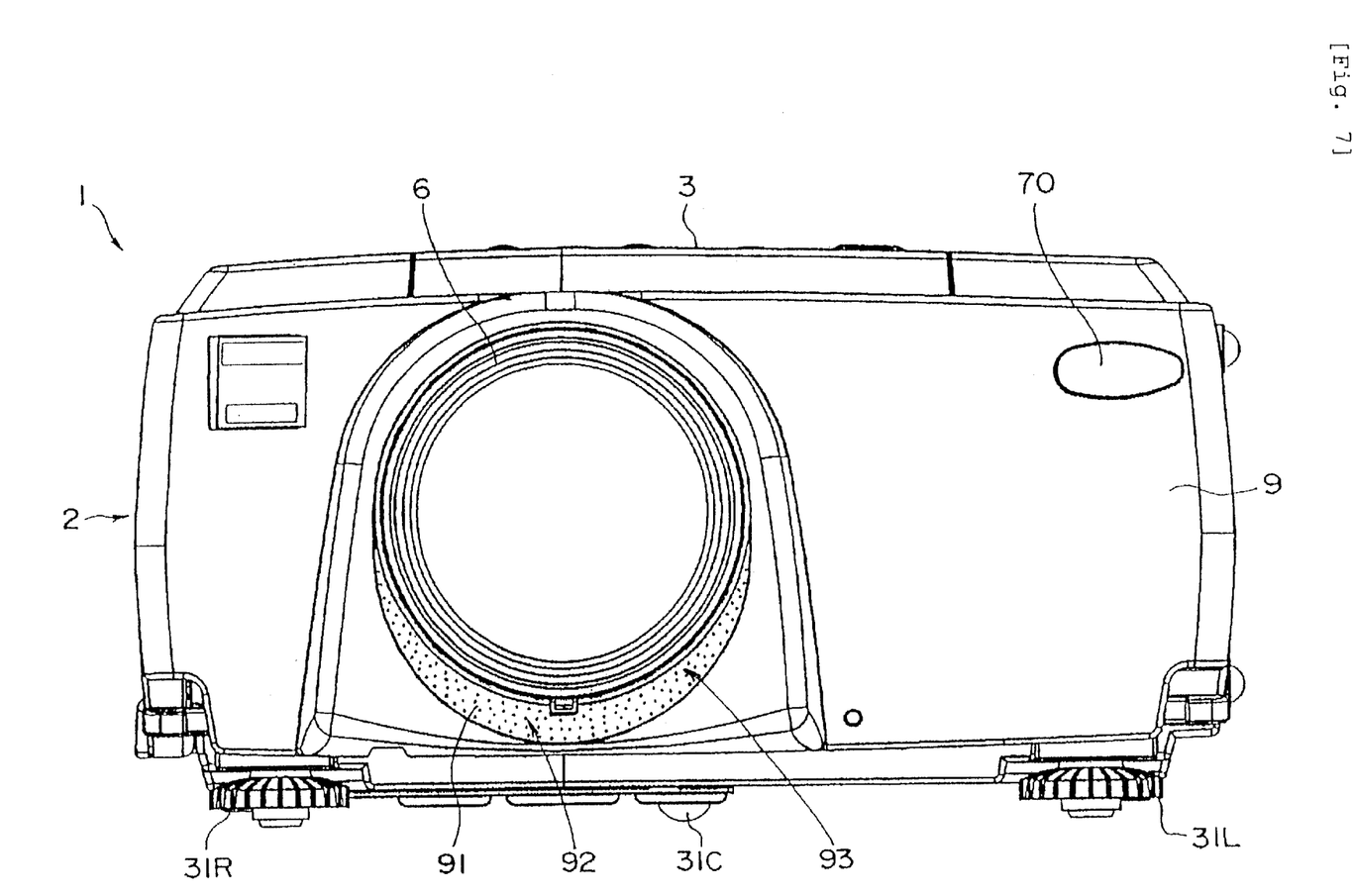
FIG. 7 is a front view of the projector of the embodiment.
Figure 8:
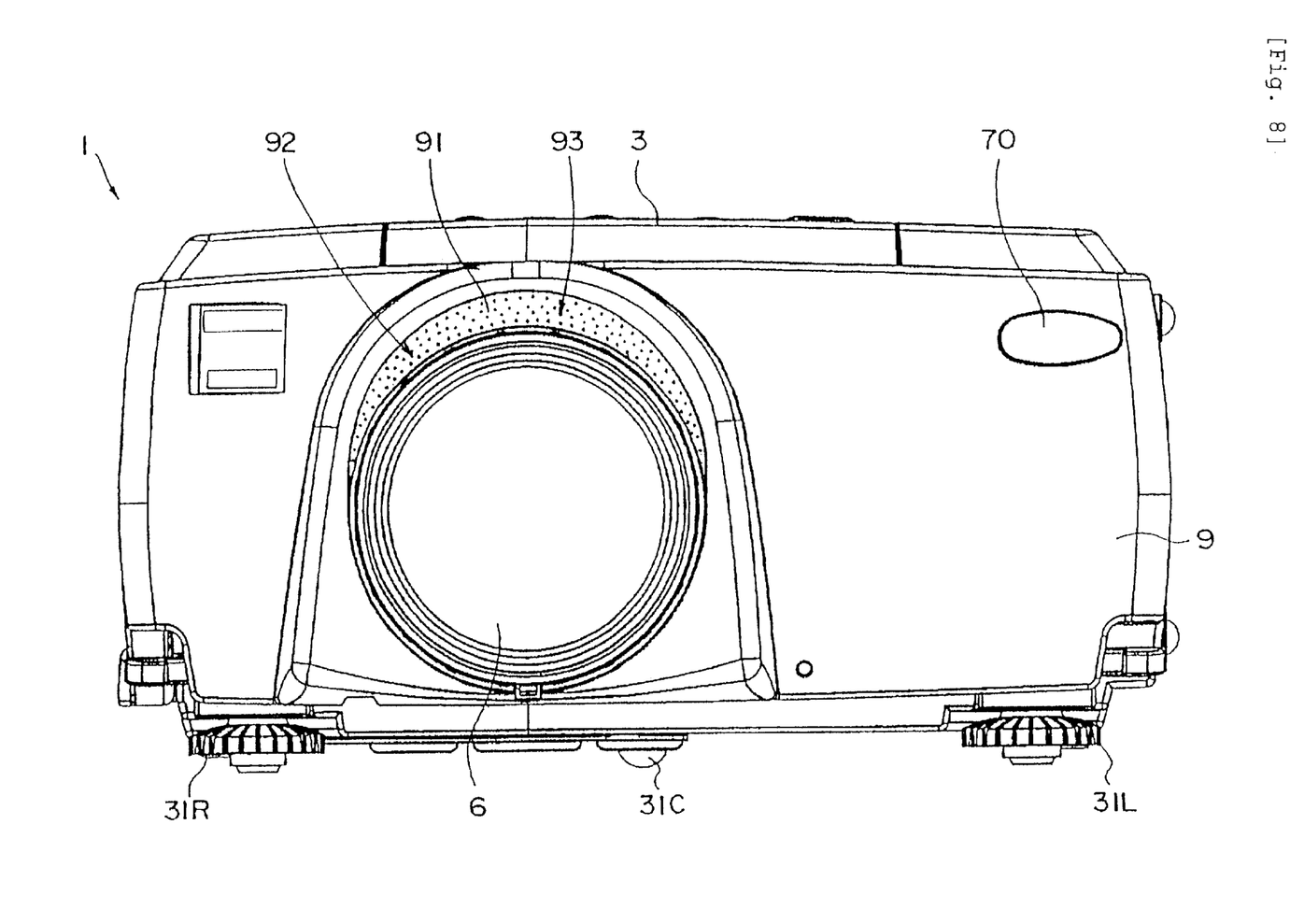
FIG. 8 is a front view of the projector of the embodiment.

On the other hand, since the ventilating member 92 has elasticity, it closes the clearance 92, and also allows the projection lens 6 to be moved upward by the lens positioning mechanism, which is not shown, as shown in FIG. 7, and to be moved downward, as shown in FIG. 8. As the ventilating member 91, an open-cell sponge, cloth mesh, or metal mesh may be adopted. The ventilating member 91 may have the same color as that of the outer casing 2 so as to be outwardly inconspicuous.

(6) Structure of Lens Positioning Mechanism

Figure 9:
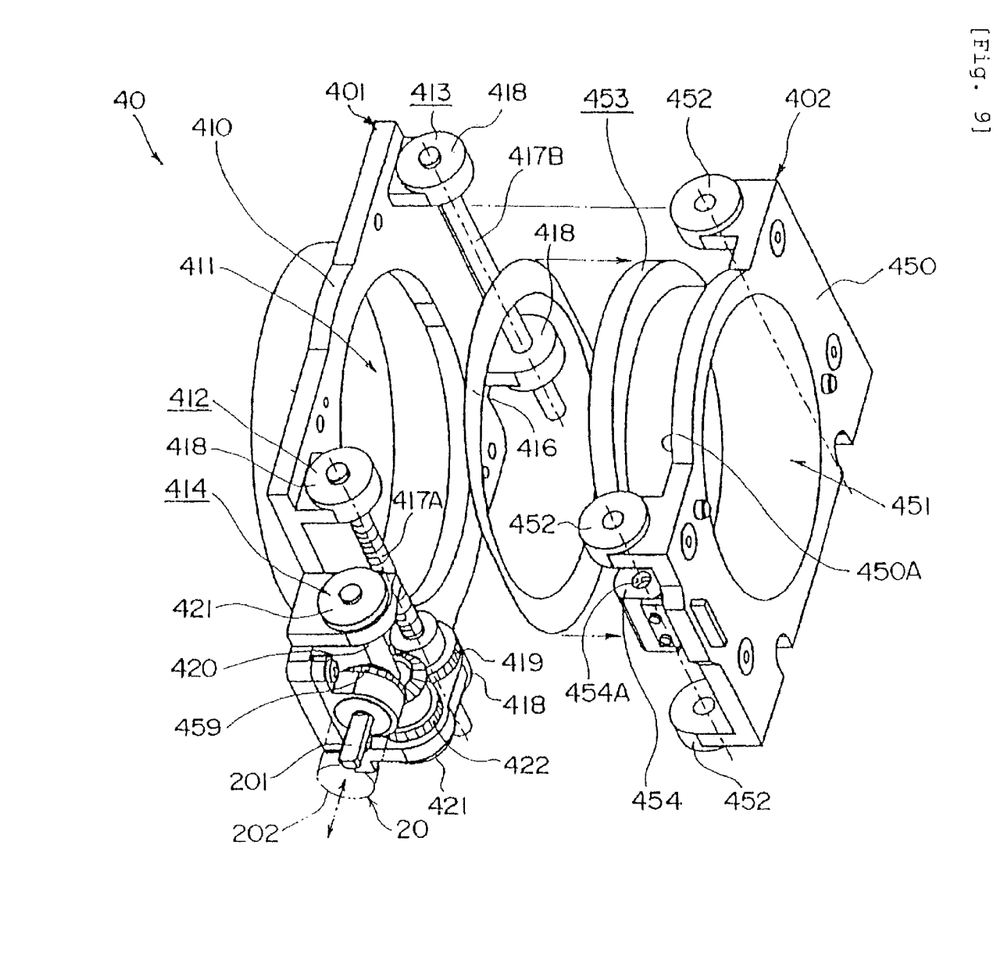
FIG. 9 is an exploded perspective view of a lens positioning mechanism in the embodiment.

FIG. 9 shows the lens positioning mechanism 40. The lens positioning mechanism 40 includes a fixed member 401 fixed to the head member 903, and a movable member 402 to which the light incident side of the projection lens 6 is connected, and which is slidably mounted on the fixed member 401.

The fixed member 401 includes a main body 410 shaped like a nearly square plate and having an opening 411 shaped like an elongated hole at the center thereof, a first guide member 412 and a second guide member 413 mounted on both sides of the main body 410, and a rotation transmission mechanism 414 provided adjacent to the first guide member 412.

The first guide member 412 includes a rod-like shaft portion 417A extending in the vertical direction, and nearly cylindrical bearing portions 418 for supporting both ends of the shaft portion 417A. The shaft portion 417A is a threaded shaft member that is threaded on the outer peripheral surface, and is provided with a gear 419 at the bottom thereof. The shaft portion 417A and the gear 419 turn together.

The second guide member 413 includes a rod-like shaft portion 417B extending in the vertical direction, and nearly cylindrical bearing portions 418 for supporting both ends of the shaft portion 417B, in a manner similar to the first guide member 412. The shaft portion 417B is a shaft member that is not threaded on the peripheral surface.

The rotation transmission mechanism 414 includes a shaft portion 420, bearing portions 421 for supporting both ends of the shaft portion 420, a first gear 422 having a spur wheel surface to be engaged with the gear 419 and mounted integrally with the shaft portion 420, and a second gear 459 to be engaged with a bevel gear surface of the first gear 422. The rotary knob 20 is attached to the second gear 459.

The movable member 402 includes a main body 450 shaped like a nearly square plate and having a nearly circular opening 451 at the center thereof, nearly cylindrical bearing portions 452 provided at the four corners of the main body 450, a cylindrical portion 453 formed on a surface 450A of the main body 450 facing the fixed member 401, and a sliding member 454 mounted on one side and provided with an internally threaded hole 454A. The bearing portions 452 are fitted on the bearing portions 417A and 417B of the fixed member 401, and the internally threaded hole 454A of the sliding member 454 is in threaded engagement with the shaft portion 417A.

An airtight member 416 which may be formed of a black felt member having air tightness is provided on a surface of the movable member 402 facing the fixed member 401. Since the outline of the airtight member 416 is elliptic, even when the movable member 402 is slid vertically, a clearance is not formed between the movable member 402 and the fixed member 401.

Figure 10:
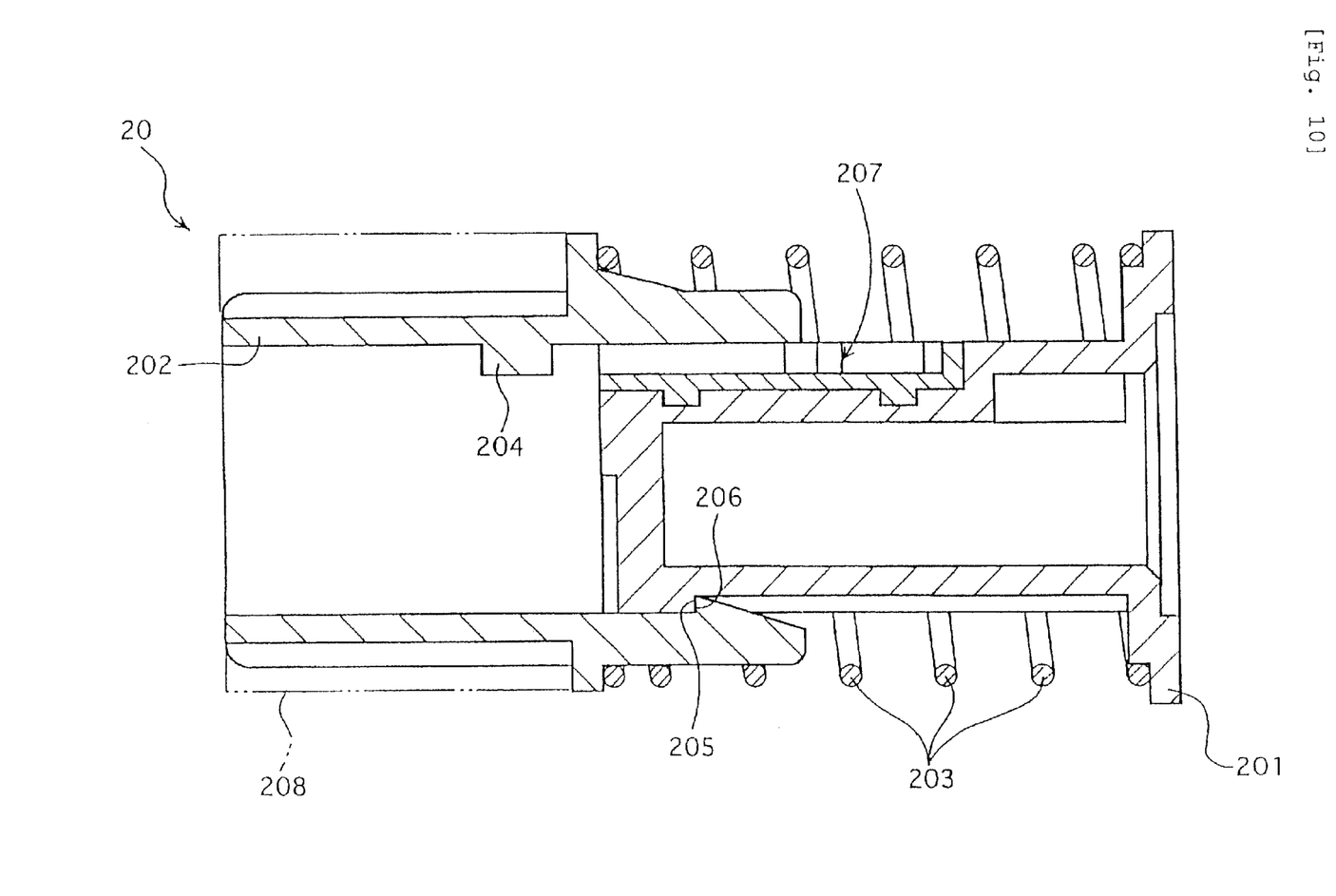
FIG. 10 is a sectional view of a rotary knob in the embodiment.

Such a lens positioning mechanism 40 is operated by the pop-up rotary knob 20 incorporated in the second gear 459. As shown in FIG. 10, the rotary knob 20 includes a core portion 201 incorporated in the second gear 459, a cover portion 202 fitted on the core portion 201, a spring 203 interposed between a flange portion of the core portion 201 and a flange portion of the cover portion 202, and a decorative member 208 (shown by two-dot chain lines) for covering the cover portion 202.

On the leading and base end sides of the core portion 201, retaining portions 206 and 207 are formed corresponding to projections 204 and 205 formed inside the cover portion 202. The cover portion 202 is thereby allowed to switch the retaining position with respect to the core portion 201 each time it is pressed, and is projected from and retracted into the outer casing 2, as shown by a solid line and a two-dot chain line in FIG. 6.

More specifically, when the cover portion 202 is pressed once, the projection 204 is retained by the retaining portion 207. When the cover portion 202 is pressed once more, the projection 204 is disengaged from the retaining portion 207, the cover portion 202 is moved (popped up) by the spring 203 toward the leading end of the core portion 201, and the projection 205 is retained by the retaining portion 206.

Even when the cover portion 202 is turned while being retained at the base end of the core portion 201, the core portion 201 is inhibited from turning. Conversely, when the cover portion 202 is turned while being retained at the leading end of the core portion 201, the core portion 201 turns.

In this embodiment, when the lens positioning mechanism 40 is operated, the cover portion 202 provided with the decorative member 208 is projected relative to the outer casing 2, and is turned. In short, when the cover portion 202 is turned, the core portion 201 that is retaining the cover portion 202 turns, and the first gear 422 is turned via the second gear 459.

When the first gear 422 turns, the gear 419 turns, and the shaft portion 417A also turns. According to the direction of turn, the sliding member 454 slides vertically, and the movable member 402 also slides vertically. Since the projection lens 6 is connected to the movable member 402, it is thereby moved vertically, whereby the image projecting position can be controlled.

(7) Advantages of the Embodiment

The above-described embodiment provides the following advantages.

That is, since the dustproof ventilating member 91 is mounted in the clearance 92 formed between the rim of the opening 93 of the outer casing 2 and the projection lens 6 in the projector 1, cooling air can be reliably drawn into the device 1 via the ventilating member 91. Since this eliminates the necessity of forming a meshed air inlet in the outer casing 2, it is possible to facilitate the production of the outer casing 2, and to facilitate the operation of manufacturing the projector 1. Moreover, cooling efficiency is maintained well, and the outward appearance is improved. Since the ventilating member 91 also has elasticity, it does not interfere with the motion of the projection lens 6. Furthermore, since the color of the ventilating member 91 is made the same as that of the outer casing 2, the exterior of the projector 1 is unified, which can further add to the outward appearance of the projector 1.

Since the airtight member 416 is provided on the surface of the movable member 402 facing the fixed member 401, the space between the fixed member 401 and the movable member 402 can be sufficiently enclosed, and there is no fear that light will leak from the sliding portion of the lens positioning mechanism 40.

Since the black airtight member 416 is used, even when light serving as an image formed by the electro-optical device 925 impinges on and is reflected from the light incident side of the projection lens 6 connected to the movable member 402, it can be absorbed by the airtight member 416. This can sufficiently reduce the reflectance inside the device 1. Furthermore, since the airtight member 416 may be formed of a felt member, it is possible to improve the sliding ability of the movable member 402 relative to the fixed member 401 while ensuring sufficient air tightness between the fixed member 401 and the movable member 402.

The rotary knob 20 is used in which the cover portion 202 is projected from the outer casing 2 when the lens positioning mechanism 40 is operated, and, conversely, the cover portion 202 is pushed into the device 1 so as not project from the outer casing 2 when the lens positioning mechanism 40 is not operated. Therefore, it is only necessary to project the cover portion 202 of the rotary knob 20 only when operating the lens positioning mechanism 40. There is no fear that the rotary knob 20 will be broken in carrying the projector 1, and handling is thereby facilitated.

In addition, when the cover portion 202 of the rotary knob 20 is depressed inside the device 1, the end face of the rotary knob 20 and the surface of the outer casing 2 are nearly flush with each other. For this reason, the surface of the outer casing 2 is simplified, and the outward appearance of the projector 1 is improved.

(8) Modifications of the Embodiment

The present invention is not limited to the above-described embodiment, and includes the following modifications.

For example, while the movable member 402 of the lens positioning mechanism 40 is controlled by the rotary knob 20 in the above embodiment, it may be manually moved and controlled after the outer casing 2 is detached each time the image projecting position is adjusted. The control by the rotary knob 20 is, however, more preferable because it is easier.

While the rotary knob 2 is retractably mounted in the outer casing 2 in the above embodiment, it may be always projected from the outer casing 2.

While the airtight member 416 is provided to fill the space between the fixed member 401 and the movable member 402 in the above embodiment, it may be removed as long as the opening 411 of the fixed member 401 is sufficiently smaller than the opening 451 of the movable member 402, and a space is not formed between the fixed member 401 and the movable member 402 even when the movable member 402 moves vertically.

While the ventilating member 91 has the same color as that of the outer casing 2 in the above embodiment, it may have a different color.

The ventilating member 91 need not always have elasticity, and may be formed of, for example, a bellows-like metal mesh or the like that fills the clearance 92 without interfering with the motion of the projection lens 6.

While the airtight member 416 has a black exterior in the above embodiment, it may have an exterior of any color, such as white, red, or blue.

While the lens positioning mechanism 40 vertically moves the projection lens 6 in the above embodiment, it may move the projection lens 6 horizontally. The direction may be appropriately set in operation.

While the electro-optical device 925 is composed of the TFT-drive liquid crystal panels 925R, 925G, and 925B in the above embodiment, the present invention may be applied to a projector having an optical modulation device of other drive types.

While the electro-optical device 925 is composed of the three liquid crystal panels 925R, 925G, and 925B in-the above embodiment, the present invention may be applied to an optical modulation device composed of one or two liquid crystal panels.

While the panels constituting the electro-optical device 925 are composed of liquid crystal devices in the above embodiment, the present invention may be applied to a projector including an optical modulation device other than liquid crystals, such as that composed of plasma devices, or device panels using micro-mirrors.

While the electro-optical device 925 in the above embodiment is of the type that transmits and modulates the light beams R, G, and B, the present invention may be applied to a projector including a reflective optical modulation device that reflects, modulates, and emits incident light.

Other specific structures, shapes, and the like for carrying out the present invention may be replaced with other structures and the like as long as the object of the present invention can be achieved.

According to the present invention described above, since the dustproof ventilating member is provided in the clearance formed between the rim of the opening of the outer casing and the projection lens, cooling air can be reliably drawn into the device via the ventilating member. This makes it possible to facilitate the production of the outer casing, and to facilitate the operation of manufacturing the projector. Moreover, cooling efficiency is maintained well, and the outer appearance is improved.

What is claimed is:

1. A projector comprising:
    an electro-optical device for forming an optical image according to image information from a light beam emitted by a light source;
    a projection lens for enlarging and projecting the image formed by said electro-optical device;
    a lens positioning mechanism connected to the projection lens for adjusting a projecting position of the image; and
    an outer casing for covering a main body and for containing the electro-optical device, a portion of the projection lens and the lens positioning mechanism,
    said projection lens being projected outside the outer casing from an opening formed in said outer casing, and a clearance formed between an edge of the projection lens and a rim of said opening of said outer casing being filled with a dustproof ventilating member, wherein air is drawn into the projector through the dustproof ventilating member.

2. The projector according to claim 1, said lens positioning mechanism including a fixed member fixed to said electro-optical device, and a movable member connected to said projection lens and slidably mounted on said fixed member, and a space between said fixed member and said movable member being enclosed by an airtight member.

3. The projector according to claim 2, at least a surface of said airtight member being black in color.

4. The projector according to claim 2, said airtight member being formed of a felt member.

5. The projector according to claim 1, further comprising a rotary knob mounted so as to project from and retract into said outer casing, said rotary knob operating said lens positioning mechanism through a rotation transmission mechanism.

6. The projector according to claim 4, further comprising a rotary knob mounted so as to project from and retract into said outer casing, said rotary knob operating said lens positioning mechanism through a rotation transmission mechanism.

* * * * *